United States Patent [19]

Ferenc

[11] 4,377,802
[45] Mar. 22, 1983

[54] LAMP/REFLECTOR ASSEMBLY

[75] Inventor: Robert A. Ferenc, Middletown, Conn.

[73] Assignee: Whelen Engineering Company, Inc., Deep River, Conn.

[21] Appl. No.: 242,937

[22] Filed: Mar. 12, 1981

[51] Int. Cl.³ .............................................. B60Q 1/26
[52] U.S. Cl. ..................................... 340/84; 340/50; 340/87; 350/99; 350/101; 350/289; 362/35; 362/170
[58] Field of Search ............... 340/84, 87, 50, 366, 340/98; 362/49, 170, 24, 35, 255; 350/288, 97, 99, 100, 101, 289

[56] References Cited

U.S. PATENT DOCUMENTS

| 2,814,029 | 11/1957 | McRea | 340/50 |
| 3,764,799 | 10/1973 | Schulz | 340/84 |
| 4,104,615 | 8/1978 | Hunter | 340/84 |

Primary Examiner—John W. Caldwell, Sr.
Assistant Examiner—Donnie L. Crosland
Attorney, Agent, or Firm—Roger A. Van Kirk

[57] ABSTRACT

A reflector for rotatable signal lights includes a pair of coaxial parabolic reflecting surfaces which are interrupted and joined back-to-back with the juncture forming an aperture which defines a plane through the common focal point of the two reflecting surfaces. A lamp is positioned within this aperture so that its filament is intersected by and perpendicular to the plane formed by the aperture. The doubled-ended reflector and associated lamp is used in conjunction with any conventional type of rotating of oscillating drive.

8 Claims, 3 Drawing Figures

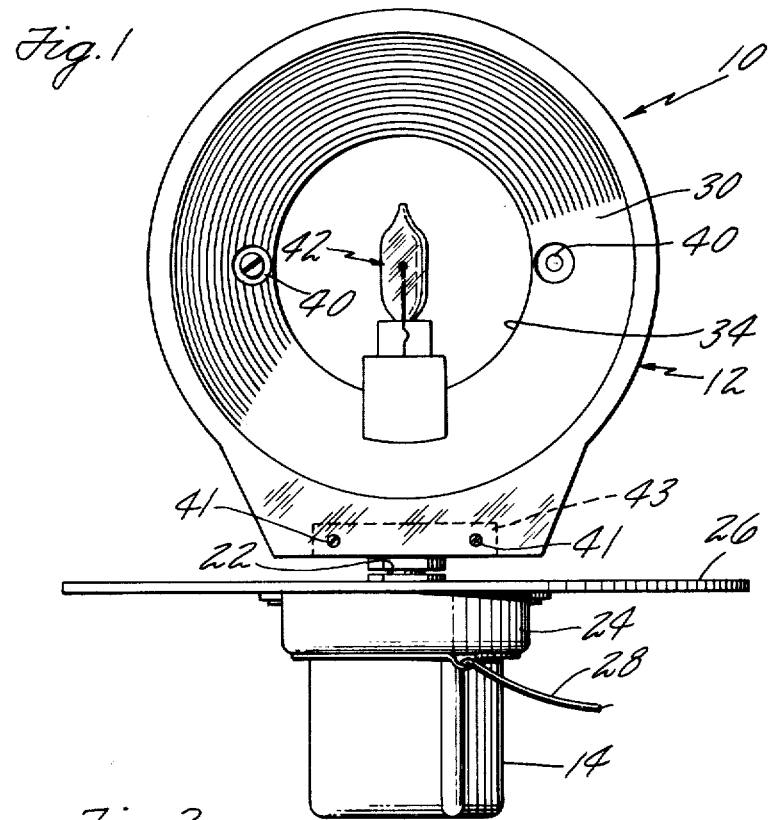
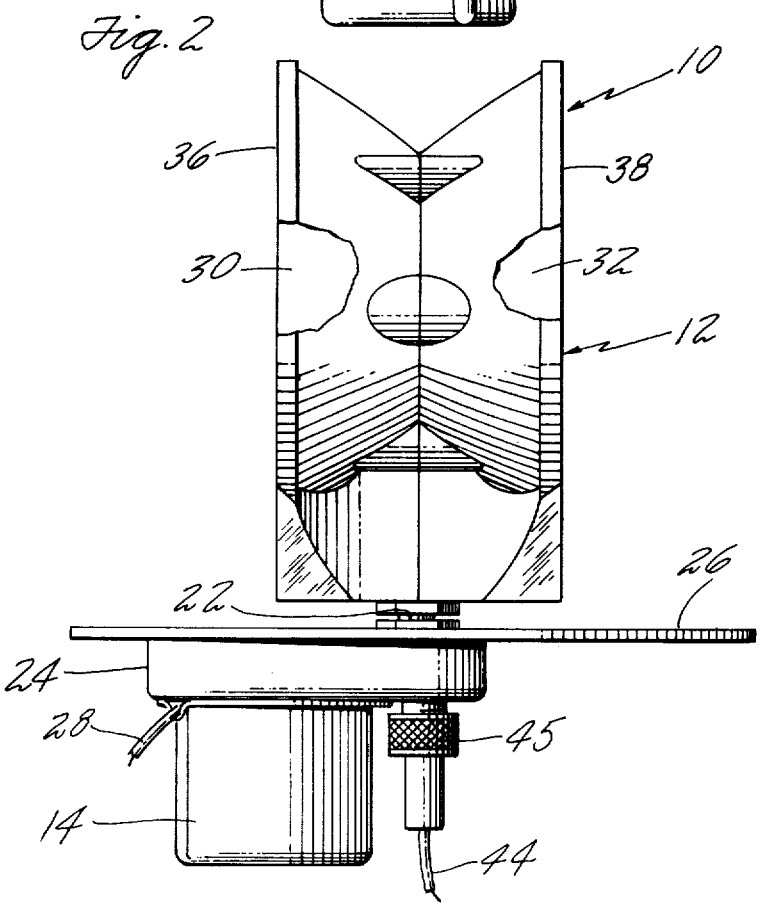

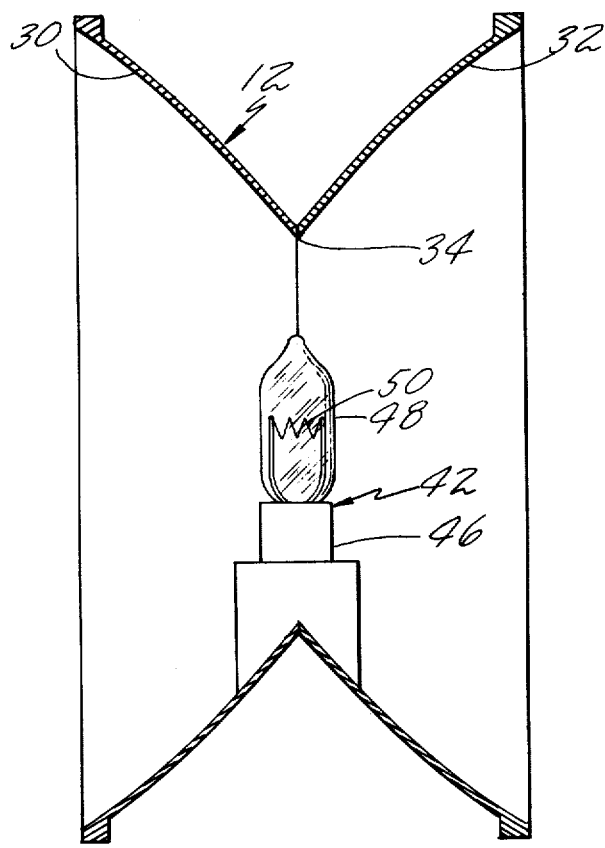

LAMP/REFLECTOR ASSEMBLY

BACKGROUND OF THE INVENTION

(1) Field of the Invention

The present invention relates to the provision of a visible warning and particularly to the generation of a flashing light. More specifically, the present invention relates to a novel reflector for emergency oscillating or rotating lights and to a warning light assembly employing the reflector. Accordingly, the general objects of the present invention are to provide novel and improved methods and apparatus of such character.

(2) Description of the Prior Art

The use of rotating or oscillating lights for identifying emergency vehicles and the like is well known in the art. Prior art rotating and oscillating light assemblies take on may different configurations. A widely used configuration of prior are emergency lights is an assembly with two incandescent lamps and their associated reflectors being mounted back-to-back. This configuration assures that light will be visible from both ends of an emergency vehicle on which the light is mounted as the assembly oscillates.

The above briefly described prior art emergency oscillating or rotating light assembly has numerous disadvantages. The mounting of two reflectors back-to-back requires a comparatively large space in order to allow the full rotation of the entire assembly. The requirement for lamps and associated reflectors increases the overall manufacturing costs of the final assembly. Furthermore, the overall energy consumption of the light assembly is increased by the need to supply power to two separate lamps and to rotate or oscillate a comparatively large assembly.

SUMMARY OF THE PRESENT INVENTION

The present invention overcomes the above-discussed disadvantages and other deficiencies of the prior art by providing a novel lamp-reflector assembly.

In accordance with the present invention a novel warning light assembly includes a single lamp associated with two oppositely directed reflector surfaces which are intersected. These reflector surfaces have a general parabolic shape with their intersection defining a circular aperture in which the focal point of each reflector lies. The light source is positioned within the plane formed by this aperture. The light source, specifically the filament of a lamp, is positioned so as to be perpendicular to and intersected by the plane formed by the aperture. This enables light to be transmitted evenly to both reflector surfaces which assures that light is visible from two directions.

The present invention has as one of its numerous objects the provision of a novel bi-directional light reflector assembly which is reduced in overall size when compared to the prior art.

Another object of the present invention is a novel warning light assembly which utilizes only one lamp and is characterized by reduced overall power consumption when compared to the prior art.

Finally, another object of the present invention is to provide a novel lamp and reflector assembly which has a reduced manufacturing cost and enhanced visibility when in use.

BRIEF DESCRIPTION OF THE DRAWINGS

The present invention may be better understood and its numerous objects and advantages will become apparent to those skilled in the art by reference to the accompanying drawings wherein like reference numerals refer to like elements in the several drawings, and wherein:

FIG. 1 is a front elevation view of a preferred embodiment of a novel light assembly in accordance with the present invention;

FIG. 2 is a side view of the light of FIG. 1; and

FIG. 3 is an enlarged schematic view showing the relationship of the two intersecting reflectors and lamp of the assembly of FIGS. 1 and 2.

DESCRIPTION OF THE PREFERRED EMBODIMENT

Referring to FIGS. 1 and 2 jointly, a warning light assembly is indicated generally at 10. Assembly 10 includes a reflector, indicated generally at 12, and a motor 14 for rotating or oscillating the reflector 12. Motor 14 will typically be a conventional small electric motor, typically a d.c. motor, having a rotatable output shaft. The motor output shaft is coupled to a rotatable shaft 22, on which reflector 12 is mounted, by means of a drive located within gear case 24. Gear case 24 is secured to a base 26 which acts as a support for the entire assembly 10. Motor 14 is supplied with power through cable 28.

Reflector 12 is provided with two concave surfaces 30 and 32. These surfaces 30 and 32 are coaxial and arranged within reflector 12 in back-to-back relationship. The intersection of surfaces 30 and 32 defines a circular aperture 34. A lamp subassembly, indicated generally at 42, is positioned within the reflector so as to be intersected by the plane of aperture 34. Lamp subassembly 42 is supplied with power via cable 44 and a rotatable connector 45.

By using parabolic reflectors, with the light source mounted at the common focal point of the two back-to-back reflectors, highly focused and oppositely directed beams of light will be produced upon energization of the lamp is subassembly 42. Rotation or oscillation of the reflector 12 will, accordingly, cause a stationary viewer to perceive a high-intensity flashing light source.

In the preferred arrangement reflector 23 is formed in two sections 36 and 38 which are provided with the concave surfaces 30 and 32, respectively. Sections 36 and 38 are typically fabricated from plastic which is metallized after forming into the desired shape so that at least the surfaces 30 and 32 are reflective. Sections 36 and 38 are assembled, preferably by bolts 40 and screws 41. As indicated in phantom in FIG. 1, in the disclosed embodiment a retangular hollow is defined by the bottoms of reflector sections 36 and 38 and a metal plate 43 is received in this hollow. The screws 41 engage plate 43 from both sides; i.e., both of sections 36 and 38 are provided with screws 41. The plate 43 adds rigidity to the structure and provides a member which can be securely coupled to the rotatable drive shaft 22. The assembly of the reflector sections 36 and 38 by means of bolts and screws is desirable since high operating temperatures may be encountered during operation of the warning light assembly and these temperatures could have an adverse effect on presently available adhesives. The entire reflector 12 is mounted on shaft 22 by a conventional technique.

Referring now to FIG. 3, a schematic view of the positioning of lamp subassembly 42 within the plane formed by aperture 34 may be seen. Surfaces 30 and 32 have preferably a parabolic shape. Lamp subassembly 42 is comprised of socket unit 46 wich holds lamp 48. Lamp subassembly 42 is positioned so that filament 50 of lamp 48 is intersected by and perpendicular to the plane formed by aperture 34. Filament 50 is also located, as close as manufacturing tolerances will permit, on the axis of the two back-to-back parabolic reflectors. By positioning filament 50 perpendicular to the plane of aperture 34, light is transmitted evenly to both reflecting surfaces 30 and 32. This assures that the light is reflected in both directions at the same time and with substantially equal intensity. In the preferred embodiment, the center of the filament 50 of lamp 48 is one-half inch from the vertex of each of the parabolic defined by surfaces 30 and 32 to thereby minimize the overall depth of the reflector.

In accordance with the preferred embodiment of the present invention, in the interest of minimizing power consumption while maximizing visibility, lamp 48 is filled with halogen gas. The advantages of the novel warning light of the present invention include the reduction in overall size because there is only one reflector unit. Overall power consumption is also reduced because only one lamp is being supplied with power.

While a preferred embodiment has been shown and described, various modifications and substitutions may be made thereto without departing from the spirit and scope of the invention. Accordingly, it is to be understood that the present invention has been described by way of illustration and not limitation.

What is claimed is:

1. A warning light assembly comprising:
    reflector means, said reflector means having two coaxial concave surfaces, said concave surfaces being reflective and arranged back-to-back, said surfaces intersecting at a common plane perpendicular to the axis thereof, an aperture coaxial with said surfaces being defined by the intersection of said surfaces;
    light source means, said light source means being supported in reflector means, said light source means including an incandescent lamp positioned with its filament at least in part lying in said plane of intersection; and
    means for rotating said reflector means and said light source means as a unit.

2. The warning light of claim 1 wherein said lamp is filled with a hologen gas.

3. The warning light of claim 1 wherein said concave surfaces are parabolic in shape and each has a focal point.

4. The warning light of claim 3 wherein said plane of intersection is coincident with the focal points of said parabolic surfaces.

5. The warning light of claim 4 wherein the filament of said lamp is oriented substantially transversely with respect to the said plane of intersection of said parabolic surfaces.

6. The warning light of claim 1 wherein said reflector means is comprised of a first and a second section, said first and second sections each defining a first and a second aperture, one of said concave reflective surfaces extending between the first and second aperture of each of said sections, the second aperture of each of said sections being of equal size and being smaller in cross-sectional area than the first aperture of each of said sections, said first and second sections being joined at said second apertures.

7. The warning light of claim 5 wherein said rotating means is an electric motor.

8. The warning light of claim 1 wherein said rotating means is an electric motor.

* * * * *